United States Patent Office 3,822,164
Patented July 2, 1974

---

3,822,164
APPARATUS FOR SEALING PLASTIC BAGS
Joseph J. Guido, Hinsdale, and James R. Anderson, La Grange, Ill., assignors to Co-Poly-Ex Corporation, Elgin, Ill.
Filed Nov. 24, 1971, Ser. No. 201,830
Int. Cl. B32b 31/20
U.S. Cl. 156—358                 15 Claims

ABSTRACT OF THE DISCLOSURE

A portable hand-held impulse sealer for plastic bags or the like wherein a pair of complementary Nichrome-wire heating elements are heated upon actuation of the sealer for a predetermined period of time to bond opposite edges of the open end of a plastic bag together. A spacer rod depending from the sealer head enables sealing to be efficiently accomplished by a single operator by drawing the edges of the bag together with the portions to be bonded positioned between the heating elements of the sealer. The duration of the heat cycle is automatically controlled by a novel solid-state triac timing circuit which can be adjusted to accommodate various kinds and thicknesses of material. A novel method for using the sealer to seal a plastic bag is also disclosed.

BACKGROUND OF THE INVENTION

The present invention relates to an apparatus for sealing thermoplastic sheet material, and more particularly to an improved impulse-type light-weight hand-held sealing tool for sealing plastic bags and a method for the use thereof.

In recent years the use of bags formed from plastic resins such as polyethylene, and the like, for packaging merchandise has displaced to a substantial extent the use of paper bags and cardboard boxes. Plastic bags have the advantage of increased strength, greater tear resistance, and lower per-unit cost, and can be manufactured in transparent form or with any desired color. Furthermore, plastic bags are water-proof, and therefore can be used to transport moisture-laden produce such as vegetables and meat, obviating the need for additional wrapping.

These attributes of plastic bags make them particularly well-suited for use by grocers and other merchants for packaging customer purchases at a check-out counter. For instance, when packaging canned goods and other heavy items it is now often necessary to use two paper sacks, one inside the other to obtain sufficient strength. This doubles the packaging cost, since with plastic bags sufficient strength would be obtainable in a single bag. Paper bags are ordinarily not moisture-proof, and should a paper bag become wet either from its contents or exposure to weather, it loses its strength and may not survive the walk from the check-out counter to the customer's car.

A further advantage of plastic bags to merchants is that they can be sealed, either completely or partially, by impulse heat sealing methods. In the case of complete sealing a permanent air-tight bond protects the merchandise packed within from the weather or possible contamination. Moreover, in some stores a completely sealed bag may be desirable to protect against shoplifting. With a partial seal, such as that which will be described presently, a convenient handle may be formed on top of the plastic bag to facilitate carrying the bag with one hand. Of course, it may be preferable at times not to seal the bag at all, as when it is only partially filled or where the customer desires to reuse the bag.

Unfortunately, known processes for sealing plastic bags are not completely suitable for the often-hurried environment of a store check-out counter, where sometimes inexperienced personnel must effect a seal in a minimum amount of time. To be entirely acceptable, a sealing process for this environment must be quick, economical, and not require the application of adhesives or the assistance of another person to perform. Equally important, the apparatus employed in the sealing process must provide means for accurately positioning the seal, and must not have any exposed heated areas which might accidentally burn the operator or a customer. Preferably the apparatus will be economical to construct, compact in size, light in weight, and capable of operation with one hand.

Generally, in an impulse type sealing operation a wire-like heating element is disposed in close proximity to the plastic sheets as they are pressed together by pressure members, the element is momentarily energized to fuse the sheets, and while pressure is still being applied, the weld is allowed to cool to form a permanent bond. One problem with this operation has been that of applying the correct amount of heat to the plastic sheets, the quality of the seal being dependent to a large extent on the temperature of the heating element and the duration of its application. Insufficient heating does not produce a strong seal, and excess heating may rupture or melt the film, and perhaps injure the products being wrapped.

Accordingly, it is an object of the present invention to provide new and improved apparatus for sealing thermoplastic sheet material.

It is a more specific object of the present invention to provide new and improved apparatus for sealing a plastic bag which includes provision for accurately positioning the seal on the rim of the bag.

It is a still more specific object of the present invention to provide an improved apparatus for sealing plastic bags which does not have exposed heated surfaces capable of inflicting burns.

It is still another object of the present invention to provide an impulse-type apparatus for heat sealing plastic bags which has a light-weight hand-held unit and a separate controlled power supply unit.

It is still another specific object of the present invention to provide improved apparatus for sealing thermoplastic sheet material which provides a more precisely controlled application of heat.

It is still another object of the present invention to provide an improved method for sealing a plastic bag which is more economical in terms of time and material.

In accordance with the invention, a heat sealing tool for forming a bond between sheets of heat-sealable film at a predetermined location on each sheet comprises sealing means comprising a pair of relatively movable pressure members having an open position in which the members are in spaced relation to one another, and a closed pressure-applying position for energizing a heat sealable film positioned therebetween, and indexing means for locating the sheets at a predetermined spatial relation to the pressure members to effect a seal at the predetermined location upon movement of said pressure members to the closed position.

In further accord with the invention, a hand-held sealing tool for forming a bond between predetermined portions of the rim of the open end of a bag of heat-sealable film comprises sealing means comprising a pair of handle members pivotally connected to reciprocate a pair of platen heating elements between an open position, and a closed position wherein the elements engage with sufficient heat and pressure to effect a seal on the heat-sealable film, and indexing means comprising a spacer depending from one of the handle members for engaging the inner edge of the rim to position the predetermined portions of the rim between the platen heating elements as the open end of the bag is drawn taut between the heating elements from a point opposite the spacer.

In further accord with the invention, a sealing tool for forming a bond between two sheets of heat-sealable film comprises a pair of handle members adapted to be grasped in one hand and operatively connected to reciprocate a pair of platen heating elements between an open position wherein the platen elements are in a spaced relationship, and a closed position wherein the elements are pressed toward engagement, and means responsive to the handle members being reciprocated from the open position toward the closed position for powering the platen heating elements for a predetermined time interval.

In further accord with the invention, an impulse power supply for applying current to an electric load such as a heating element or the like for a predetermined period of time in response to and following an applied control effect, comprises a source of electrical current for powering the load, electric switch means coupled between the current source and the load for controlling current flow therethrough, a timing circuit for initiating a timing cycle upon interruption of an applied current, a control circuit operable from an applied current and coupled to the timing circuit for rendering the electric switch means conductive only during the timing cycle, and activation means responsive to the applied control effect for interrupting to the timing circuit and for applying current to the control circuit to render the switch means conductive for the duration of the timing cycle.

In further accord with the invention, a method for sealing the open end of a plastic bag or the like at one or more locations on its rim to provide an integral carrying handle for the bag, the method utilizing a hand-held impulse-type sealing tool comprising a head portion having a pair of heating platens operatively connected to come together in a pressure and heat-applying closed position and further having a spacer depending from one of the platens to engage the rim of the bag opening at a predetermined distance from the closed position of the heating platens, comprises the steps of grasping the sealer head in one hand, engaging the spacer with the inside of the rim of the bag opening, grasping the rim of the bag with the other hand at a location approximately opposite that of the point of engagement of the spacer, pulling the bag taut between the point of spacer engagement and the point of grasp, thereby drawing opposite sides of the rim together, positioning the taut sides of the rim between the heating platens, applying pressure to the platens to activate the heating elements and accomplish the seal, and removing the seal head and its depending spacer from the now sealed end of the bag.

BRIEF DESCRIPTION OF THE DRAWINGS

The features of the present invention which are believed to be novel are set forth with particularly in the appended claims. The invention, together with further objects and advantages thereof, may be best understood by reference to the following description taken in connection with the accompanying drawings, in the several figures of which like reference numerals identify like elements, and in which:

FIG. 1 is a perspective view, partially fragmentary, of a sealing apparatus for plastic bags constructed in accordance with the invention in position for sealing the open end of a plastic bag;

FIG. 2 is a cross-sectional view taken along lines 2—2 of FIG. 1;

FIG. 3 is a front elevational view of an alternately shaped heating element for use with the apparatus of FIG. 1;

FIG. 4 is a schematic diagram of the electrical circuitry of the sealer apparatus of FIG. 1;

FIG. 5 is a perspective view of a plastic bag packed with merchandise and awaiting application of a seal;

FIG. 6 is a perspective view of the bag of FIG. 5 after its open end has been partially sealed; and FIG. 7 is a perspective view of the bag of FIG. 6 being carried by means of the integral handle formed by the partial seal of its open end.

DESCRIPTION OF THE PREFERRED EMBODIMENT

Referring to FIG. 1, the sealer apparatus of the invention is seen to comprise two distinct units, a power supply unit 10, in which the majority of the electronic control and power supply circuitry is contained, and a light-weight, hand-held head unit 11, which is shown in position over the top of a plastic bag 12. The heavy power components are all contained within the stationary power supply unit, allowing the hand-held sealer head to be light-weight and maneuverable. The two units are connected by a flexible multi-conductor cable 13, which establishes the necessary electrical connections for controlling the operation of power supply 10 and powering the heating elements of head unit 11.

The sealer head includes sealing means in the form of a pair of pressure members comprising inwardly facing channular T-shaped handles 14, and 15, each having at one end substantially identical cross-wise extending platen work surfaces, 16 and 17, respectively. Handle 14 is dimensioned to fit within channel 15 and is operatively connected thereto by a pivotal connection, which may be accomplished in various ways including that of the present embodiment wherein a single rivet 18 is passed through both handles at their narrow end. This arrangement for relative movement between the handles defines an operating cycle such that the platens will be brought into co-operative compressive engagement on opposite sides of the thermoplastic sheet material when the handles are displaced from their open position to a closed position. The two handles are biased apart into their open position by a compression spring 19 force-fit onto appropriate upstanding cylindrical studs 20 and 21 molded into the bottoms of the channels of handle members 14 and 15, respectively. Handle 14 is notched at its narrow-end to provide a tab 22 for limiting the maximum separation of the platen surfaces when the handles are in their fully extended or open position. The handles are preferably constructed of a high-impact plastic or similar material having good heat and electrical insulating properties, and form housings or enclosures for other members of the apparatus to which reference will presently be made.

In accordance with one aspect of the invention, the head unit 11 of the sealer incorporates indexing means in the form of a spacer rod 23 which greatly facilitates the sealing operation. Spacer 23, which may have a variety of sizes and shapes to accommodate various sizes of bags and working conditions, is shown in FIG. 1 as it would be used to position the head unit of the sealer relative to bag 12. To accommodate different bag sizes and shapes, it would of course often be desirable to utilize differently sized and shaped spacers, and to this end spacer 23 is removably mounted to the sealer head 11 by means of cylindrical sockets 24 molded into the top of the platen portion 17 of handle 15. The sockets may be rectangular, square, or otherwise keyed to prevent misalignment of spacer 23, but in any event are preferably provided with thumb-screws or equivalent retainer elements 25 for preventing undesirable withdrawal of the spacer. Two sockets are provided to accommodate operator preferences for a left or right extending spacer.

To provide suitable mounting means for a heating element, the platen portion 16 of handle 14 has an elongated channel portion 26 molded along substantially its entire length. An elongated electrically non-conductive heat-insulating bar-shaped support member 27 is force-fit into this channel and dimensioned so that its outer face 28 extends a short-distance beyond the face of platen 16. Face 28 is preferably outwardly bowed and adapted to resiliently resist depression so as to improve the contact between the plastic sheets and the heating elements, and contains a notch 29 extending medially its entire length to accommodate a laterally elongated, electrically powered heating element in the form of a Nichrome wire 30 of substantially rectangular cross-section. Such wires are of low thermal inertia, that is, they reach a high temperature in a minimum of time and cool rapidly when the energizing current is interrupted. The wire is preferably formed as a ribbon, and may typically have a width of 1/16 inch, a thickness of .002 inch, and a resistance of approximately 1.7 ohms per foot.

Member 27 is also notched lengthwise medially to its opposite or inner face to provide a raceway 31 suitable for carrying one or more wires 32 to establish an electrical circuit with heating element 20. In order to resist the tendency of the heating element 30 to stick to the heated plastic film, the member may be covered with a glass fiber cloth 33 extending the length of spacer 27 and force-fit into channel 26 therewith. Various other materials well known to the art may also be used.

As seen in FIG. 1, heating element 30 is drawn taut along notch 29 and folded into channel 26 at each end of element 27. After reaching the bottom of the channel, the ends of the heating element extend inwardly along raceway 31 wherein they are spliced to a conventional conductor to complete the electrical circuit. Of course, spacer element 27 may be notched at its extremities and elsewhere as necessary to accommodate this wiring. Furthermore, element 27 may be provided with one or more holes extending through its width should it be desired to utilize a heating element not extending the entire length of the element, or one in which the connection to outside wiring is made at other than the folded ends. A complementary heating element 34 is contained in the opposite handle, but the mounting structure for this element will not be shown here to avoid undue duplication of description.

While the heating element 30 has been thus far shown as a straight Nichrome wire, it will be appreciated that the wire may be formed into other shapes. For example, it may be desirable to utilize a U-shaped sealing element, such as Nichrome wire 35 in FIG. 4, when partially sealing the open end of a plastic bag. This presents a rounded handle surface which makes the bag easier to carry with one hand. It will be appreciated that changing the shape of the heating element would necessitate certain changes in support element 27, but no changes to the circuitry of the sealer would be required except perhaps for adjustment of the heating cycle to accommodate a change in the length and resistance of the heating elements.

To provide for automatic activation of the heating elements upon closure of the handle, a single-pole, double-throw micro-switch 36 is mounted within the channel of handle 15. An actuator block 37 appropriately positioned within the channel of handle 14 actuates switch 36 upon receipt of a control effect, in this case the compression of the two handles. By means of appropriate connections established by wiring contained within the channel of handle 15 and cable 13 the activation of switch 36 is utilized as means to activate and interrupt current flow in appropriate circuits of power supply 10 in a manner now to be described.

Referring to FIG. 4, the circuitry of the sealer apparatus is seen to be divided between power supply unit 10 and the sealer head 11, the two units being connected by a five conductor cable 13. Operating power for the apparatus is provided by a step-down transformer 38. The primary winding 39 of this transformer is connected to a source of standard 110 v. AC line current represented by a line cord 40 through the series combination of a fuse 41 and a single-pole, single-throw switch 42, which serves as the main power switch for the sealer. A neon pilot light 43 and an appropriate series dropping resistor 44 are shunt-connected across the primary winding to provide an indication that power is being applied. Series resistor 44 may be integrally mounted in the neon light socket in some commercially available assemblies. While transformer 38 is shown as having only a single primary winding 39, it will be appreciated that a double or split winding could be provided instead and appropriately connected to permit the sealer to operate on other input voltages, such as 220 v. AC.

One terminal of the secondary winding 45 of transformer 38 is connected through the main electrodes of an electric switch element, triac 46, to one terminal of each of the two Nichrome heating elements 30 and 34, the remaining terminals of which are connected to the remaining terminal of secondary winding 45. This completes an electrical circuit to the heating element, so that whenever triac 46 is conductive the two elements are effectively connected across winding 45 to provide the desired heating action. As suggested by the heavy lines in FIG. 4, these connections must be made with heavier than normal wire (No. 14 or larger) to accommodate the heavy current flow to the sealing elements, which may exceed several amperes. For this same reason, a heat-sink should be provided for the triac to avoid overheating of that device.

In accordance with a second aspect of the invention, the sealer incorporates novel circuitry for controlling the conduction of triac 46 with the precision required for consistently attaining high-quality seals. Unidirectional operating current is obtained for the circuit by connecting the one terminal of winding 45 to a plane of reference potential, or ground, and by connecting the remaining terminal to ground via the series combination of a diode 47 and a capacitor 48. This forms a half-wave rectifier, the combination producing at its juncture a source of unidirectional current of approximately 15 volts.

The juncture of diode 47 and capacitor 48 is connected by a conductor in cable 13 to the transfer contact of activating means in the form of a single-pole, double-throw switch 36, which it will be recalled is actuated upon displacement of the sealer handles. In its unactivated state the transfer contact of switch 36 is spring-biased to a normally closed contact, and this contact is connected back to a timing circuit in the power supply unit by another conductor in cable 13, and then through a current limiting resistor 49 to one terminal of a timing capacitor 50. The other terminal of capacitor 50 is connected to ground, and a resistance network serially comprising a fixed resistor 51 and the body of an interval control potentiometer 52 is also connected between this one terminal and ground. The arm of potentiometer 52 is also grounded, so that this network effectively forms a variable-resistance shunt across the capacitor for varying the discharge time constant of that component in a manner to be presently explained. Timing capacitor 50 is also connected to the input electrode, or base, of an NPN transistor 53 by a series discharge-time-constant determining resistor 54. The common electrode, or emitter, of transistor 53 is grounded and the output electrode, or collector, is connected by a coupling resistor 55 to a PNP transistor 56, which comprises part of a control circuit within the power supply unit. The collector of transistor 56 is connected by a coupling resistor 57 to the control electrode of triac 46 and the emitter of transistor 56 is connected via the remaining wire in cable 13 to the normally open contact of switch 36 in the sealer head.

In operation, power is supplied to line cord 40, switch 42 is closed, and transformer 38 is energized. This develops an alternating voltage of approximately 12 volts on winding 45, which is rectified by diode 47 and capacitor 48. Since the transfer contact of switch 36 is initially in its normally-closed position, timing capacitor 50 is quickly charged through resistor 49 by the unidirectional current developed at the juncture of diode 47 and capacitor 48. Since resistor 49 has a low resistance, typically on the order of 10 ohms, the capacitor is very quickly brought up to a full charge. During this time a current is also caused to flow through the emitter-base junction of transistor 53, rendering that device conductive. Since the collector of transistor 53 is connected to the base of transistor 56, the latter device would also be conductive were it provided with a suitable source of emitter current. However, the emitter of transistor 56 is connected to the normally-open contact of switch 36, which prior to actuation of the sealer is open, so transistor 56 cannot now conduct. It follows then that no current flows through the collector of transistor 56 to the control electrode of triac 46, so that device also cannot conduct and heating elements 30 and 34 are not energized.

Now, if handles 13 and 14 are compressed, as if to seal the top of a bag, switch 36 is actuated. This removes the unidirectional current supply to capacitor 50, and instead connects it to the emitter of transistor 56. Recalling capacitor 50 to have been previously charged, this capacitor now discharges through the path formed by resistor 54 and the emitter-base junction of transistor 53, and through the parallel discharge path formed by resistor 51 and potentiometer 52. As a result, transistor 53 remains conductive until the current from capacitor 50 through its emitter-base junction falls below the threshold level required to sustain conduction. The actual duration of this interval may be varied by adjusting potentiometer 52, which together with resistor 51 comprises a discharge path in shunt with the discharge path through resistor 54 and transistor 53. The lower the net resistance of the shunt path, the more quickly the stored energy in capacitor 50 dissipates and the shorter the period of conduction of transistor 53.

Once switch 36 is actuated, supply current is applied to the emitter of transistor 56. Since transistor 53 is still conducting at this time, the resulting emitter-base current in transistor 56 renders that device conductive. The resulting collector current through resistor 57 renders triac 46 conductive, applying the full AC output of winding 45 to the two parallel-connected heater elements 30 and 34.

An indicator light in the form of a light-emitting diode 58 is mounted in handle 15 and connected in shunt with heater elements 30 and 34 via a series current limiting resistor 59, to give the operator a positive visual indication that the heating elements are operating. A diode 60 connected across the light emitting diode rectifies the applied alternating current to form pulsating direct current for operating the light. With this indicator light, once potentiometer 52 has been set to provide the proper heating interval, the sealer may be applied to each succeeding bag until the indicating light goes out in each case, thus providing a sure indication that a full measure of heat has been applied in each sealing operation.

Conduction in transistor 56, and hence triac 46, continues only so long as capacitor 50 is able to maintain conduction in transistor 53. Once this capacitor discharges below the threshold emitter-base sustaining current of transistor 53, that transistor stops conducting, terminating the base current and hence the conduction of transistor 56. In practice, the parameters of the timing circuit are selected to provide a heating interval in the order of 0.7 seconds for plastic bags of average thickness. Triac 46 now being open, the low thermal inertia Nichrome heating elements 30 and 34 quickly cool so that the sealer can be removed from the work. Once the handles are released, the current source is removed from transistor 56 and reconnected to capacitor 52, which quickly charges to enable the cycle to begin anew.

The following are a set of component values which have been successfully used in the described sealer circuit. These values are given only by way of example, and in no sense by way of limitation.

| | |
|---|---|
| R30 | 1/16 inch x .002 inch x 8 inch Nichrome wire. |
| R34 | 1/16 inch x .002 inch x 8 inch Nichrome wire. |
| R49 | 10 ohm, ½ w. |
| R51 | 5600 ohms, ½ w. |
| R52 | 50 K ohm Linear Taper. |
| R54 | 470,000 ohms, ½ w. |
| R55 | 3300 ohm, ½ w. |
| R57 | 120 ohm, 2 w. |
| R59 | 270 ohms, ½ w. |
| C48 | 500 mf., 25 v. DC electrolytic. |
| C50 | 10 mf., 20 v. DC electrolytic. |
| Q53 | RCA 40668. |
| Q56 | 2N3638. |
| D47 | IN4001. |
| D58 | Monsanto MV10A/B. |
| D60 | IN4001. |
| NE43/R44 | Dialeo 1531–1537–1531–640. |
| T38 | Stancor P–6378, pri. 115 v., sec. 12 v./8A. |

By virtue of the previously described apparatus of the invention, an additional inventive aspect suggests itself in the form of a method for packaging goods in a plastic bag. This method is more efficient and economical of time and material than previous methods, and is particularly well adapted to the consumer grocer bagging field.

First, the packed bag is positioned, as in FIG. 5, open end up, on a counter. Now, the sealer apparatus of the invention is taken in one hand and positioned over the open-end of the bag, the spacer 19 of the sealer extending and engaging the inside edge of the rim of the bag opening as shown in FIG. 1. Then, by pulling on the opposite inside edge of the rim with his other hand, the operator draws the rim of the bag taut from the point of spacer engagement, causing opposite sides of the rim to come together proximate the platen surfaces of the sealer head. By repositioning the sealer head and/or the taut rim of the bag, the adjacent sides of the bag can be brought to lie between the platen surfaces and a seal can be applied to the bag opening, as seen in FIG. 6, by compressing the sealer handles in the manner previously described. This having been done, the seal forms an integral handle to facilitate carrying the bag with one hand. This is seen in FIG. 7, where with one hand the bag is carried by the newly formed handle.

Thus, a novel apparatus has been shown and described for economically and efficiently sealing a plastic bag. Because of its unique construction, the sealer is light-weight and very easy to use, being self-positioning, and requiring no particular training or skill on the part of the operator. The seal may be either partial or complete, depending only on the physical dimensions of the sealing elements in the sealer head, and may be straight or curved as desired. The resulting seal is strong and permanent, and in the case of a partial seal may also serve as a convenient integral handle to assist the customer in carrying the bag. For these reasons, and because it requires no warm-up time and has no exposed heated parts, the sealer is especially well adapted for use at crowded hurried retail store check-out counters.

The sealer controls its own heat cycle, always providing the correct duration and amount of heat for consistent high-quality bonds. The electrical timing circuitry employed is reliable and economical to construct, and is fully adjustable to accommodate a wide variety of plastic materials and thicknesses.

It will be appreciated that the apparatus of the invention may be used for other purposes than sealing bags, such as a bending or cutting tool for plastic tile or other heat bendable materials. Furthermore, the timing circuit utilized in the sealer may be put to other uses such as timing photographic exposures or other uses where an electrical load must be energized for a predetermined period of time following a happening or event. Furthermore, the sealer apparatus of the invention makes possible a novel and improved method for sealing plastic bags which requires less time and is less expensive to perform than previous methods.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A heat sealing tool for forming a bond between sheets of heat-sealable film comprising opposite sides of the rim of the open end of a plastic bag at a predetermined location on each sheet comprising:
   sealing means comprising a pair of relatively movable pressure members having an open position in which said members are in spaced relation to one another, and a closed pressure-applying position for engaging a heat-sealable film positioned therebetween; and
   indexing means comprising a spacer depending from one of said pressure members for engaging the rim of said open end of said plastic bag at a location circumferentially equi-distant from said predetermined seal locations to effect a seal at said predetermined seal locations upon movement of said pressure members to said closed position.

2. A heat sealing tool as described in claim 1, wherein said pressure members each comprise a handle portion and a platen portion, said platen portions being pressed into engagement in said closed position, and wherein said sealing means include a pivotal operating connection between said handle portions.

3. A heat sealing tool as described in claim 2, wherein said handle portions are adapted to be clasped in one hand, and are pivoted at one end and carry said platen portions at their other end.

4. A heat sealing tool as described in claim 3, wherein said platen portions comprise heating elements and wherein means responsive to said pressure members being displaced from said open position to said closed position are provided for powering said heating elements for a predetermined time interval.

5. A hand-held sealing tool for forming a bond between predetermined portions of the rim of the open end of a bag of heat-sealable film comprising:
   sealing means comprising a pair of handle members pivotally connected to reciprocate a pair of platen heating elements between an open position, and a closed position wherein said elements engage with sufficient heat and pressure to effect a seal on said heat-sealable film;
   and indexing means comprising a spacer depending from one of said handle members for engaging the inner edge of said rim to position said predetermined portions of said rim between said platen heating elements as said open end of said bag is drawn taut between said heating elements from a point opposite said spacer.

6. A sealing tool as described in claim 5, wherein said spacer is adapted to engage the inner edge of said bag such that the rim of said bag when drawn taut is substantially parallel to the pivotal axis of said handle-form elements.

7. A sealing tool as described in claim 5, wherein said spacer engages said rim of said bag at a point lying in the plane defined by the pivotal axis of said handle members and the point of engagement of said platen heating elements.

8. A heat sealing tool for forming a bond between sheets of heat-sealable film at a predetermined location on each sheet, comprising:
   sealing means comprising a pair of relatively movable pressure members having an open position in which said members are in spaced relation to one another, and a closed pressure-applying position for engaging a heat-sealable film positioned therebetween;
   a heating element included in at least one of said relatively movable pressure members;
   an impulse power supply for applying current to said heating element, said power supply including a source of electrical current, an electric switch means coupled between said current source and said heating element for controlling current flow therethrough, a timing circuit for initiating a timing cycle upon interruption of an applied current, an additional current source, a control circuit operable from an applied current and coupled to said timing circuit for rendering said electric switch means conductive only during said timing cycle, and activation means comprising a switch responsive to closure of said pressure members for interrupting current to said timing circuit and for applying current from said additional source to said control circuit to render said switch means conductive for the duration of said timing cycle, said timing circuit comprising a first transistor having input, output, and common electrodes, and requiring a threshold current level through said input and common electrodes to maintain conduction between said output and common electrodes, a timing capacitor, means including a series resistance for coupling said timing capacitor between said input and common electrodes, and means for applying said current from said activation means to said capacitor to maintain a discharge current through said input and common electrodes and said series resistance above said threshold level for the duration of said timing cycle; and
   indexing means comprising a spacer for locating said sheets at a predetermined spatial relation to said pressure members to effect a seal at said predetermined location upon movement of said pressure members to said closed position.

9. A heat sealing tool as defined in claim 8, further including a variable resistance circuit coupled across said capacitor to vary the time required for the discharge current from said timing capacitor to fall below said threshold level and thereby vary the duration of said timing cycle.

10. A heat sealing tool as defined in claim 8 wherein said electric switch means has main electrodes coupled between said source and said load and a control electrode, and said control circuit comprises:
    a second transistor having input, output and common electrodes;
    means for coupling said output electrodes of said second transistor to said control electrodes to render said electric switch conductive when said second transistor is conductive; and,
    means for coupling said input electrode of said second transistor to said output electrode of said first transistor to render conduction in said second transistor dependent on conduction in said first transistor; and,
    means for applying said current from said activation means to said common electrode of said second transistor to enable conduction in said second transistor following occurrence of said control effect.

11. A power supply as defined in claim 10 wherein said source for powering said load comprises an alternating current source, said electric switch means comprises a triac and said additional current source comprises a rectifying means for converting alternating current from said load powering source to uni-directional current.

12. A power supply as defined in claim 11 wherein said first transistor is an NPN device, said second transistor is a PNP device, said input electrodes are base electrodes, said output electrodes are collector electrodes, said common electrodes are emitter electrodes, and said additional source is a positive-polarity source.

13. A heat sealing tool for forming a bond between the opposite sides of the rim of the open end of a plastic bag at predetermined locations, comprising:

sealing means comprising a pair of relatively movable pressure members having an open position in which said members are in spaced relation to one another, and a closed pressure-applying position for engaging a heat-sealable film positioned therebetween;

a heating element included in at least one of said relatively movable pressure members;

an impulse power supply for applying current to said heating element, said power supply including a source of electrical current, an electric switch means coupled between said current source and said heating element for controlling current flow therethrough, a timing circuit for initiating a timing cycle upon interruption of an applied current, a control circuit operable from an applied current and coupled to said timing circuit for rendering said electric switch means conductive only during said timing cycle, and activation means responsive to closure of said pressure members for interrupting current to said timing circuit and for applying current to said control circuit to render said switch means conductive for the duration of said timing cycle; and indexing means comprising a spacer engaging the rim of said bag at a location circumferentially equi-distant from said predetermined seal locations on said rim.

14. A heat sealing tool as defined in claim 13 wherein said power supply further includes an additional current source, and wherein said activation means comprise a switch for applying current from said additional current source to said timing circuit prior to closure of said pressure members, and alternately to said control circuit following closure of said pressure members.

15. A heat sealing tool for forming a bond between sheets of heat-sealable film at a predetermined location on each sheet comprising:

sealing means comprising a pair of relatively movable pressure members having an open position in which said members are in spaced relation to one another, and a closed pressure-applying position for engaging a heat-sealable film positioned therebetween;

a heating element included in at least one of said relatively movable pressure members;

an impulse power supply for applying current to said heating element, said power supply including a source of electrical current, an electric switch means coupled between said current source and said heating element for controlling current flow therethrough, a timing circuit for initiating a timing cycle upon interruption of an applied current, a control circuit operable from an applied current and coupled to said timing circuit for rendering said electric switch means conductive only during said timing cycle, and activation means responsive to closure of said pressure members for interrupting current to said timing circuit and for applying current to said control circuit to render said switch means conductive for the duration of said timing cycle; and indexing means comprising a spacer for locating said sheets at a predetermined spatial relation to said pressure members to effect a seal at said predetermined location upon movement of said pressure members to said closed position.

References Cited

UNITED STATES PATENTS

| | | | |
|---|---|---|---|
| 2,906,847 | 9/1959 | Grevich | 156—583 X |
| 3,005,898 | 10/1961 | Rosenthal | 156—579 X |
| 3,243,574 | 3/1966 | Blythe et al. | 154—583 X |
| 3,322,603 | 5/1967 | Grasso | 156—583 X |
| 3,619,333 | 11/1971 | Mender | 156—583 |

EDWARD G. WHITBY, Primary Examiner

U.S. Cl. X.R.

156—229, 306, 359, 366, 494, 583; 219—230, 243; 307—141

UNITED STATES PATENT OFFICE
CERTIFICATE OF CORRECTION

Patent No. 3,822,164     Dated July 2, 1974

Inventor(s) Joseph J. Guido and James R. Anderson

It is certified that error appears in the above-identified patent and that said Letters Patent are hereby corrected as shown below:

Column 2, line 38, after "held" insert --head--

Column 3, line 25, after "rupting" insert --current--

Column 3, line 55, "particularly" should be --particularity--

Column 5, line 4, "elements" should be --element--

Column 11, line 31, "comprise" should be --comprises--

Signed and sealed this 22nd day of October 1974.

(SEAL)
Attest:

McCOY M. GIBSON JR.
Attesting Officer

C. MARSHALL DANN
Commissioner of Patents